United States Patent [19]

Kirby et al.

[11] 4,007,544
[45] Feb. 15, 1977

[54] CONSTANT LOAD PROBE SYSTEM FOR COORDINATE MEASUREMENT MACHINES

[75] Inventors: William E. Kirby; Robert Duncan, both of Columbia, S.C.

[73] Assignee: Westinghouse Electric Corporation, Pittsburgh, Pa.

[22] Filed: Oct. 30, 1974

[21] Appl. No.: 519,326

[52] U.S. Cl. .............................. 33/174 R; 33/1 M
[51] Int. Cl.² ............................................ G01B 3/00
[58] Field of Search ............ 33/1 M, 23 C, 174 R, 33/174 L, 174 P

[56] References Cited
UNITED STATES PATENTS

| | | | |
|---|---|---|---|
| 3,286,353 | 11/1966 | Potter | 33/174 R |
| 3,553,842 | 1/1971 | Gerber et al. | 33/1 M |
| 3,564,533 | 2/1971 | Linn | 33/1 M X |
| 3,665,608 | 5/1972 | Stockebrand | 33/1 M |
| 3,774,311 | 11/1973 | Stemple | 33/1 M X |
| 3,791,037 | 2/1974 | DiCiaccio et al. | 33/138 X |

*Primary Examiner*—Richard E. Aegerter
*Assistant Examiner*—John W. Shepperd
*Attorney, Agent, or Firm*—J. R. Campbell

[57] ABSTRACT

An arrangement for applying a constant load on the probe of a coordinate measurement machine to eliminate errors caused by operator hand pressure when the probe is manually moved into engagement with a part being measured. In coordinate measurement machines, a carriage movable in the Y axis direction bridges the part being measured. A probe on the carriage is movable in the X axis direction thereby permitting probe movement in any quadrant in X–Y axis directions. To eliminate measurement errors in the Y axis direction, a constant load is applied to the probe by a pair of spring motors mounted on opposite ends of the machine. These spring motors are connected by spring motor cables to the carriage. When the back cable is attached to the carriage, the applied force urges it in the +Y axis direction, and the front cable when attached, urges the probe in the −Y axis direction. To apply a constant load on the probe in the X axis direction, spring motors are mounted on opposite ends of the carriage. Cables from these motors are selectively connected to the probe housing to respectively urge the probe in the +X or −X axis directions. By connecting appropriate spring motor cables to the carriage and probe housing, constant loads are applied to the probe which urges it in the X–Y axis directions in any one of four quadrants.

2 Claims, 3 Drawing Figures

CONSTANT LOAD PROBE SYSTEM FOR COORDINATE MEASUREMENT MACHINES

BACKGROUND OF THE INVENTION

The invention described herein relates to coordinate measurement machines and particularly to an arrangement for applying a constant load on the machine measuring probe to help assure accurate measurements.

Coordinate measurement machines are primarily used to mechanize the inspection of parts and components which are machined or otherwise manufactured to relatively small tolerances. Commercially available machines conventionally used for carrying out inspection processes, include a heavy base casting which supports a surface plate and structural components designed to permit movement of a high precision carriage. The carriage contains a sensitive probe which measures the coordinate dimensions of machined parts, sizes and locations of holes, and the like, on either X—Y axes or X—Y—Z axes. To obtain such movements, high precision ball or needle bearing, cylindrical sleeves, rack and pinion gears, or a combination of these are used to obtain probe measurements with great accuracy. As the probe is moved into contact with a component to be measured, an electric signal is generated corresponding to the coordinates measured which is then digitally displayed on an electronic console.

Although the coordinate measurement system is designed to provide freedom of carriage movement with minimum hand pressure when the probe contacts the component being measured, it has been found that when highly precise measurements are required, i.e., to within .0001 inch operator hand pressure plays an important part in the accuracy of measurements. Either too much or too little hand pressure against the probe may often provide coordinate dimensions or measurements which are beyond the tolerances permitted for the particular part being measured. This occasionally results in scrapping or reworking of the part when the need actually did not exist. Before undertaking such reworking or scrapping of the part, the measuring process must be repeated using greater care to confirm or deny such original readings. Such actions involving reworking of parts or repetition of the measuring process results not only in high cost manufacturing operations, but also cause delays in component parts shipments which disrupts schedules of both the part manufacturer and those to whom such parts are shipped.

SUMMARY OF THE INVENTION

In carrying out the invention, the above disadvantages of the prior art are eliminated or at least substantially minimized by coupling constant load spring motors to the coordinate measurement machine carriage and a probe housing movable on the carriage. These spring motors, when appropriately connected to the carriage and probe housing, exert a constant load on the measuring probe in the X—Y axis directions in any one of four quadrants. The application of constant load holds the probe with a very slight force against the surface being measured, thus eliminating operator hand pressure and providing both more accurate measurements and repeatability of measurements taken by the same or different operators.

An object of the invention therefore is to provide a constant load on the measurement probe of coordinate measuring machines to help assure accuracy in coordinate measurements.

Another object of the invention is to apply constant load spring motors to the probe of a coordinate measurement machine to urge the probe against the surface being measured with a uniform pressure or force.

BRIEF DESCRIPTION OF THE DRAWINGS

While the specification concludes with claims particularly pointing out and distinctly claiming the subject matter of this invention, it is believed the invention will be better understood from the following description taken in connection with the accompanying drawing wherein:

DESCRIPTION OF THE PREFERRED EMBODIMENT

Figure 1:
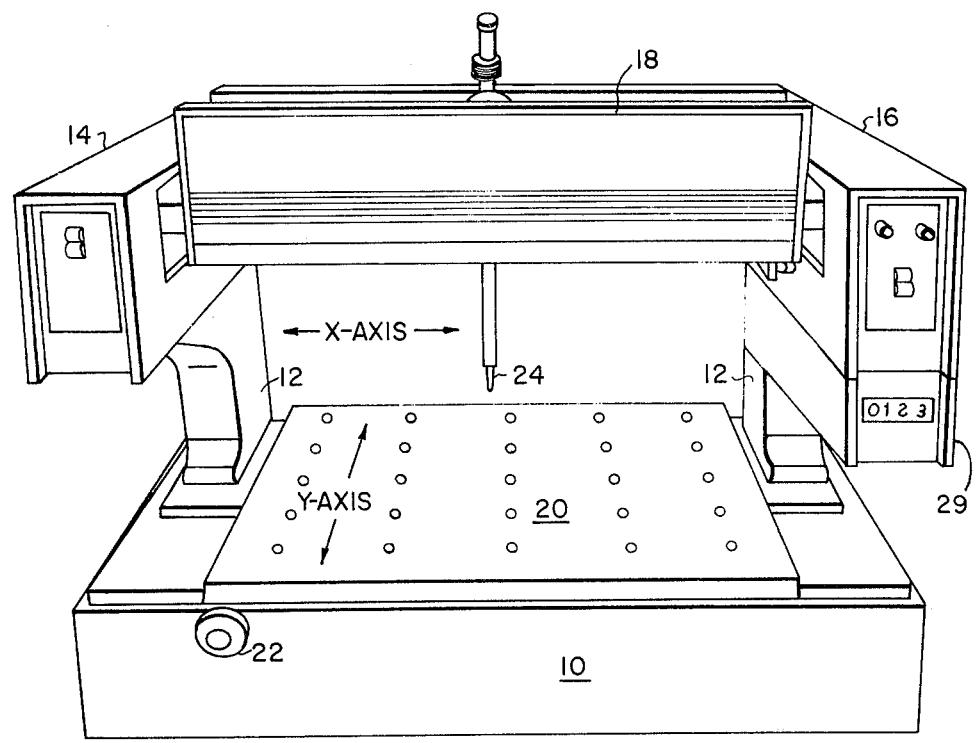
FIG. 1 is a perspective view of a conventional coordinate measurement machine which includes spring motors applied to the machine measurement probe for urging the probe in predetermined directions.

Referring now to the drawings wherein like reference characters designate like or cooresponding parts throughout the several views, there is shown a coordinate measurement machine which includes a base 10 having bridge arms 12 designed to support housings 14 and 16. A bridge-type carriage 18 is mounted for movement in the Y axis direction on housings 14 and 16 and is spaced vertically from a swivel table 20 located on base 10. The table is arranged to support a part whose coordinates are to be measured. Rotation of adjustable knob 22 swivels or orients the table to a desired position. A probe 24 slidably mounted on carriage 18 in the X-axis direction serves to measure coordinates of the part or the relative position of one part member relative to another when placed on table 20.

Although different manufacturers utilize different arrangements for effecting carriage movement, it will be understood that carriage 18 usually is mounted on a cylindrical tube or rolling type bearings to achieve movement in the Y-axis direction, i.e., from front to back of swivel table 20. Since probe 24 is rigidly but slidably mounted in the movable carriage it obviously is carried therewith. To achieve movement in the X-axis direction, i.e., from left to right of swivel table 20, probe 24 is attached to an X-axis translator which moves linearly on a cylinder fixed in the main carriage 18. In some designs, the probe 24 is immovably fixed in the carriage, while in others, it freely slides vertically in a housing thereby allowing the probe to be lifted vertically when the carriage is moved to clear any obstructions presented by parts being measured. To obtain an indication of machine usefulness, such machines generally are equipped with appropriate detectors, circuitry and an electronic readout 29, not shown, which digitally displays the dimensions of coordinates taken on a part being measured.

Figure 2:
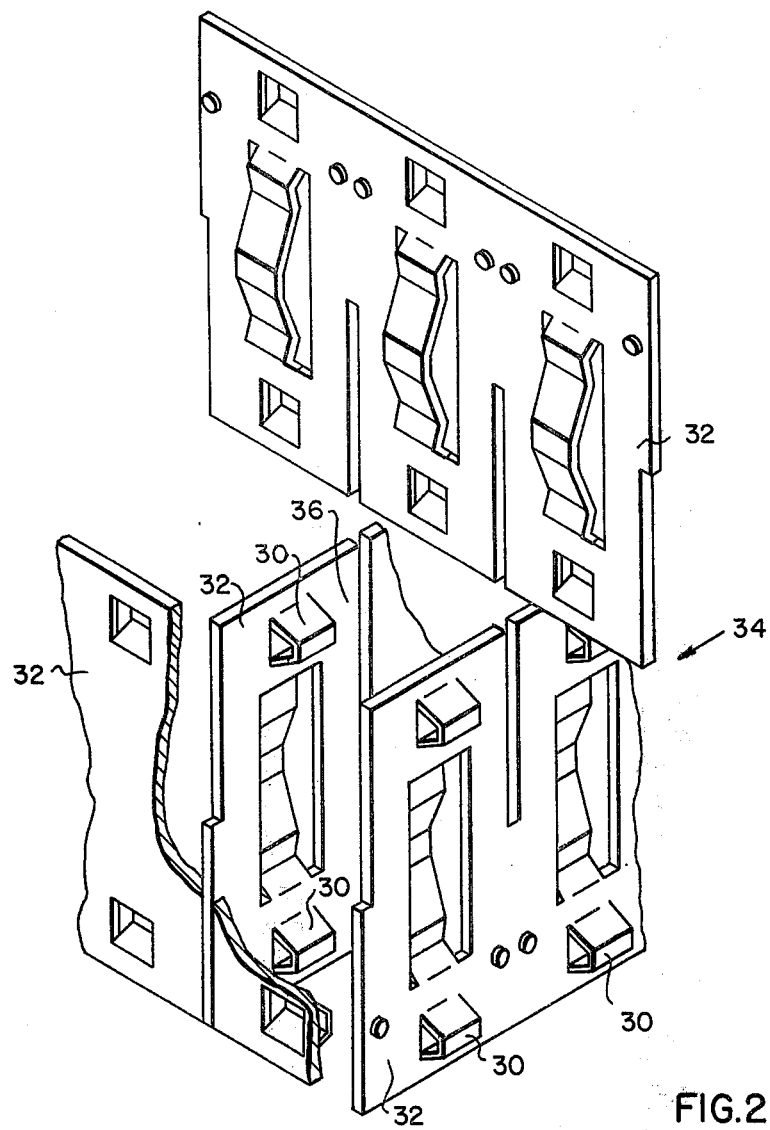
FIG. 2 is a partial showing of an egg crate grid illustrating how the various plates are joined together to form multiple cells having dimples therein which are used to illustrate the teachings of the invention.

In a specific example, machines of the type describd above are useful in measuring the distance that dimples 30, FIG. 2, extend inwardly from the walls 32 of an egg crate grid 34 used in nuclear reactor fuel assemblies. Two dimples on each adjacent side wall are aligned vertically and since it is essential that fuel rods which fit in each cell 36 formed by the walls 32 be spaced an exact distance from each other throughout their length, the dimples 30 must not be misaligned more than 0.003 inch. The machine shown to illustrate the invention is therefore used to determine alignment. When the probe 30 is first placed against the lower dimple, a reading is observed on the digital readout. The probe is then moved to the upper dimple and a second readout taken which is compared to the first. In the event of misalignment greater than 0.003 inch, that particular grid may need reworking to remedy the misalignment.

It has been found in taking such measurements that operator hand pressure may substantially vary the readings taken and that the hand pressure exerted by one operator may well differ from that of another.

Figure 3:
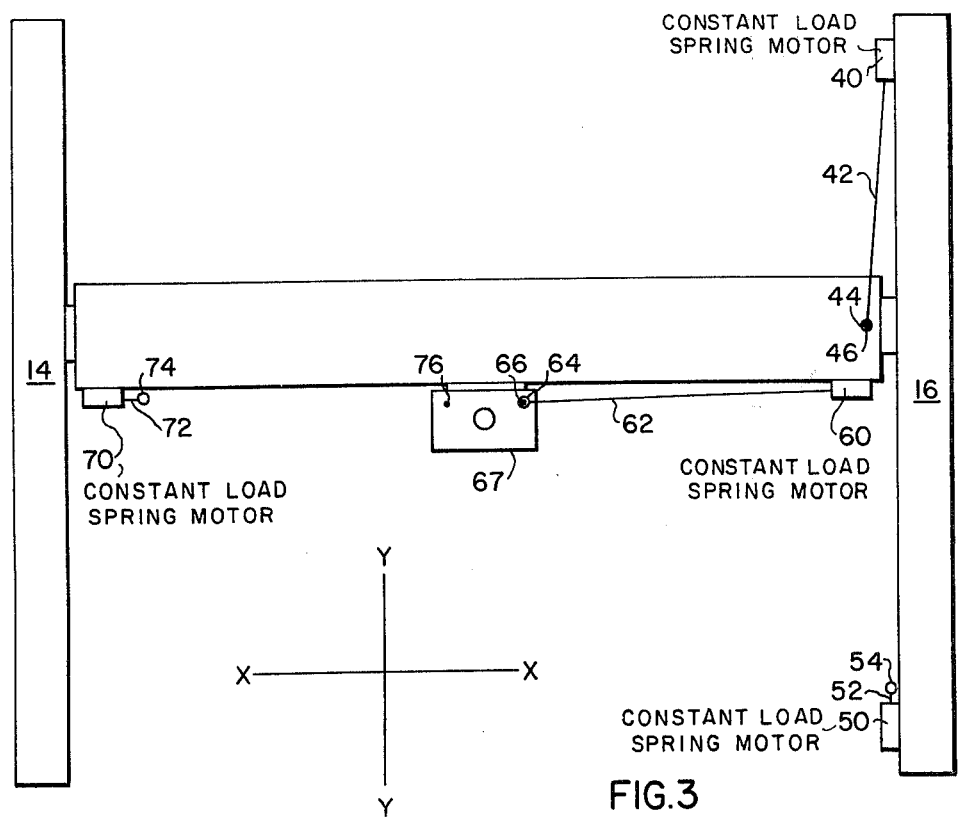
FIG. 3 is a plan view generally showing the major components of a coordinate measuring machine and including spring motors attached by cables to the machine probe for urging it in predetermined directions.

This invention accordingly overcomes these reading errors by applying a constant load on the probe when it contacts each grid dimple. The load is applied by mounting two sets of constant load spring motors on the coordinate measurement machine. As shown in the general outline plan view of a coordinate measurement machine illustrated in FIG. 3, spring motor 40 is mounted on housing 14 or 16 and a flexible cable 42 extending therefrom and having a ring 44 on one end is slipped over a pin 46 mounted on carriage 18. With spring motor 40 thus connected to pin 46, a constant load of nine ounces is applied to the carriage thus urging it in the plus Y-axis direction. Similarly, a duplicate spring motor 50 is mounted on the same housing 16 and its flexible cable 52 and ring 54 may selectively be connected to the same pin 46 on the carriage. Spring motor 50 therefore urges the carriage in the minus Y-axis direction under a constant load of nine ounces when its cable is connected to the carriage.

To achieve a uniform load in the X-axis direction, a duplicate spring motor 60 is mounted on carriage 18 and its flexible cable 62 and ring 64 is looped over pin 66 on the probe translator 67. The pulling force thus exerted on the probe translator pulls it in the plus X-axis direction. Similarly, motor 70 flexible cable 72 and ring 74 may selectively be hooked onto pin 76 mounted on the probe translator when the operator desires to load the machine in the minus X-axis direction.

It will be apparent that when measurements are taken in the +X+Y quadrant of an egg crate grid for example, cable 42 will be connected to pin 46 and cable 62 to pin 66. Likewise, to obtain coordinate measurements in the —X—Y quadrant, the previously connected rings 44 and 64 are disconnected and ring 54 hooked on pin 44 and ring 74 hooked on pin 76. Other connections to secure coordinate movements in the remaining two quadrants are believed obvious.

Different types and designs of load applying structures may be used to urge the probe into the desired quadrant, the object being to exert a uniform and constant load on the machine probe to cause it to bear against the part being measured with the same force. The spring motors disclosed herein are simple and reliable in operation and an acceptable design is Model A-1238 manufactured by the Hunter Spring Division of Ametek, Inc.

By utilizing these types of motors connected in the system as described, the uncertain and unknown factor of operator hand pressure is completely eliminated from the measurements obtained. The accuracy of measurements taken have been increased by a factor of three over that previously provided by operators using hand pressure and without the benefit of such spring motors. Further, repeatability of measurements is consistent within the tolerances incorporated in the spring motors and the coordinate measurement machine.

It will be apparent that many modifications and variations are possible in light of the above teachings. It therefore is to be understood that within the scope of the appended claims, the invention may be practiced other than as specifically described.

What is claimed is:

1. A coordinate measurement machine comprising a base having spaced upstanding bridge arms, a housing mounted on each of said bridge arms, a carriage on said spaced bridge arms supported for movement in a Y-axis direction, a probe translator having a sensing probe projecting downwardly therefrom slidably mounted on said carriage in the X-axis direction, and a readout console connected with said probe for visually displaying the measurement of part coordinates made by said probe, the improvement comprising:
   separate means mounted on opposite ends of one of said arms and on opposite ends of said carriage,
   each of said separate means comprising a spring motor having a flexible cable therein designed to exert a constant load of uniform force on an object;
   a stationary device mounted on one end of the carriage which is closest to said arm carrying the flexible cables, so that when the flexible cables on the arms are separately attached to the stationary device on the carriage, the probe will be urged in either a + or − Y axis direction;
   a pair of stationary devices mounted on opposite ends of the probe translator so that when the flexible cables on the carriage are separately connected to the stationary devices on the probe translator, the probe will be urged in either a + or − X axis direction;
   whereby upon placing the probe against a part to be measured, and appropriately connecting flexible cables respectively to the carriage and probe translator, the probe will be urged with a uniform force simultaneously in the X and Y axis directions against the part when the probe is positioned to sense part coordinates in any one of four quadrants.

2. The coordinate measurement machine according to claim 1 wherein each of said separate means comprises a spring motor, and the force applying structure therein includes a flexible spring loaded cable adapted for connection to its corresponding stationary device on the carriage or probe translator.

* * * * *